Nov. 2, 1943.    J. W. DYER ET AL    2,333,366
AIRCRAFT
Filed July 26, 1935    5 Sheets-Sheet 3
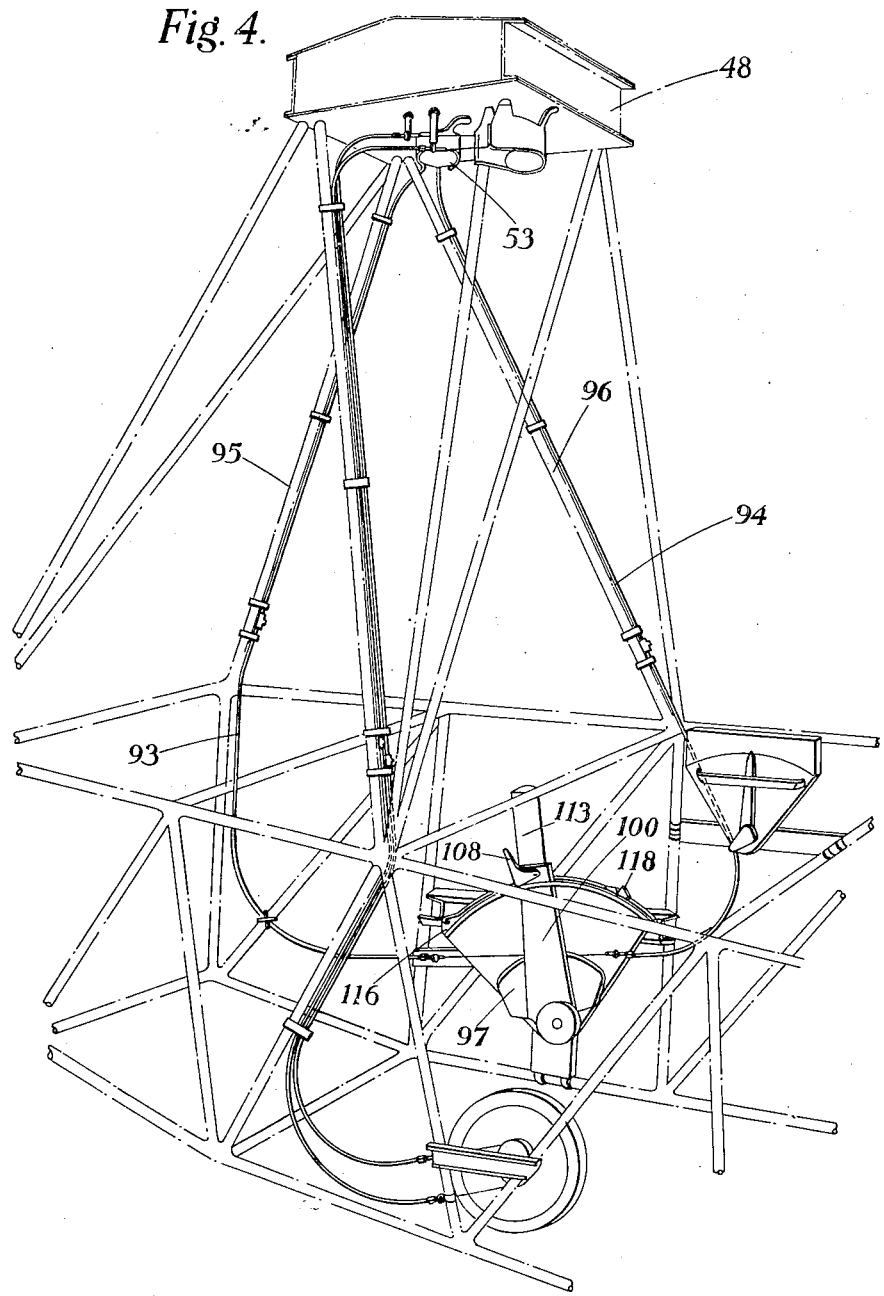

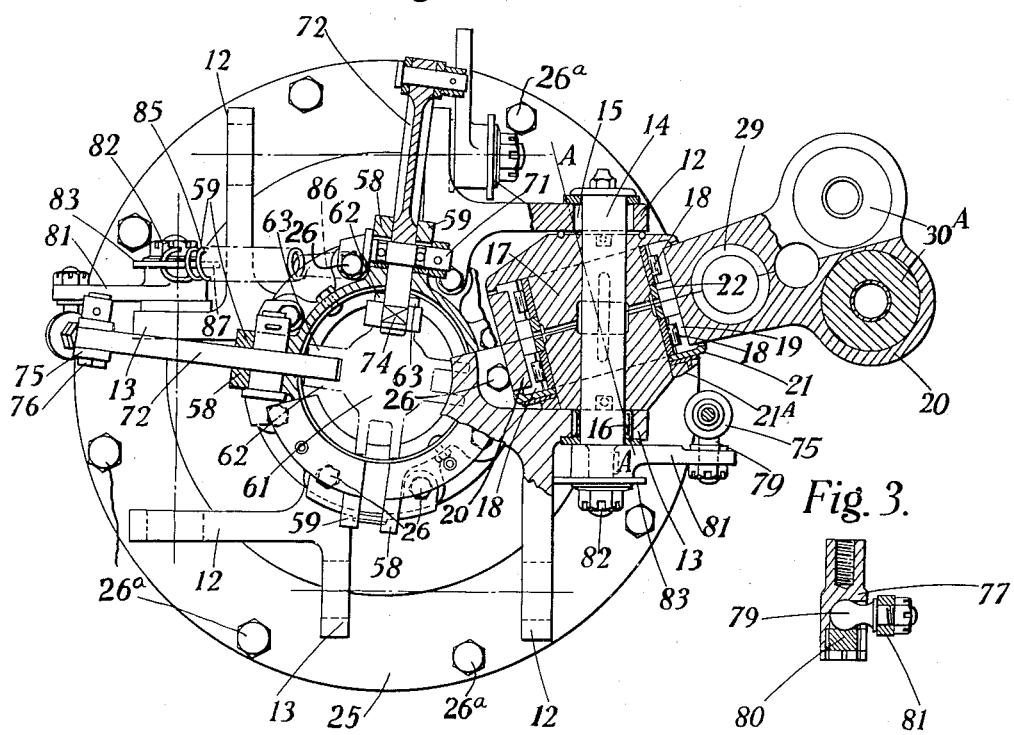

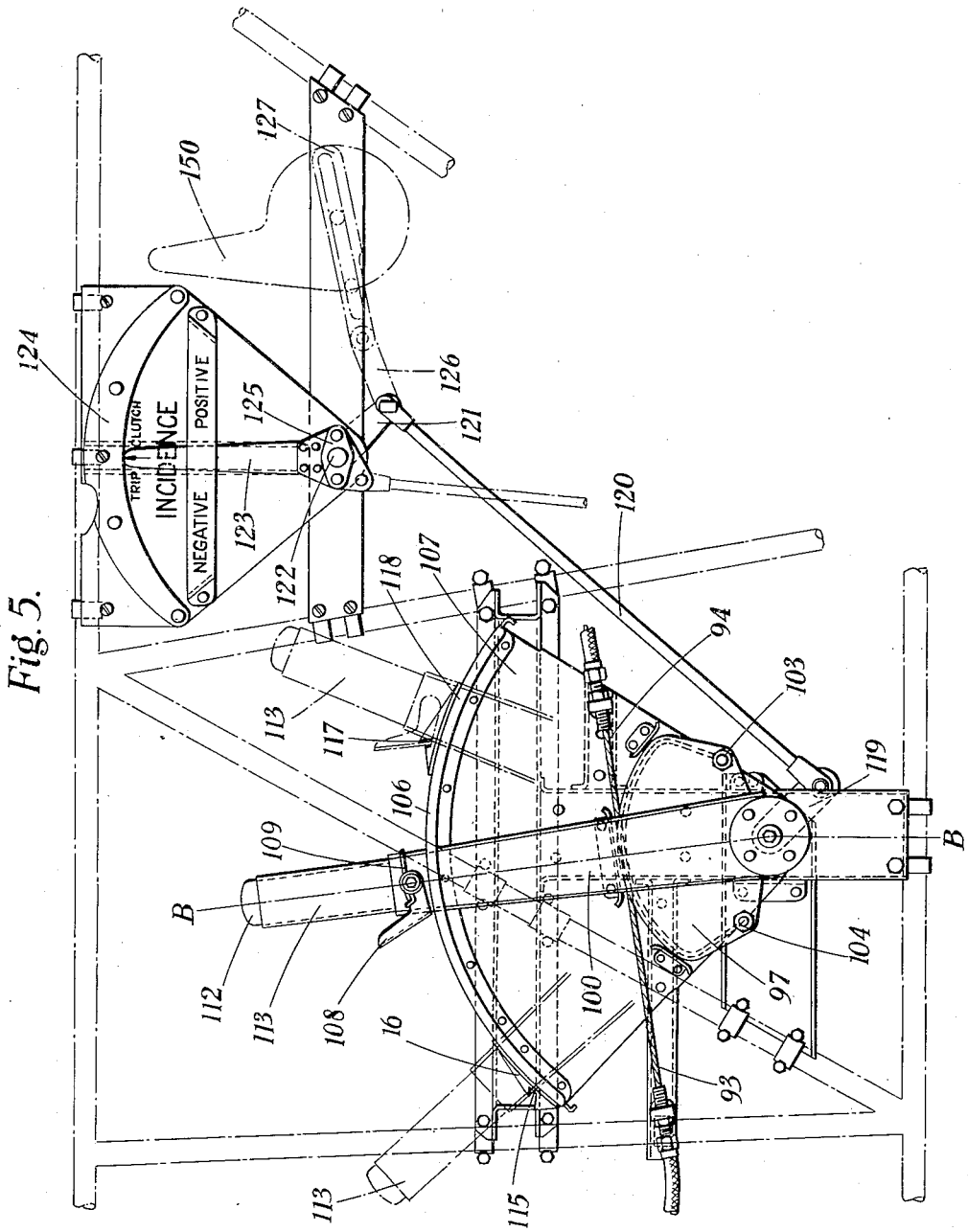

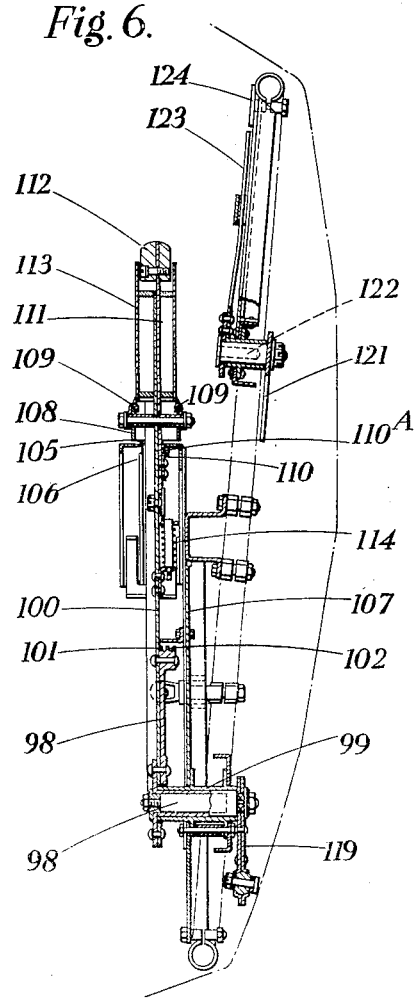

Patented Nov. 2, 1943

2,333,366

UNITED STATES PATENT OFFICE 2,333,366

AIRCRAFT

John William Dyer and David Kay, Edinburgh, Scotland, assignors to Kay Gyroplanes Limited, Edinburgh, Scotland Application July 26, 1935, Serial No. 33,398
In Great Britain July 27, 1934

15 Claims. (Cl. 244—18)

This invention relates to aircraft of the kind in which the lift is derived wholly or partly from an overhead rotative wing-system, commonly known as a "rotor," which turns about a more or less vertical mast, or other rotor supporting member, which is adapted to be tilted and or displaced bodily, and to aircraft of this kind in which the angles of incidence of the rotor blades with the air stream, i. e., the angles at which they are set to the general plane of rotation of the rotor, are variable so as to enable the lifting action to be changed to suit the conditions of the moment. The invention is particularly applicable to aircraft of the above mentioned kind in which the rotor is auto-rotative in flight, i. e. is driven under the action of the flight wind.

In taking-off with a machine of the above mentioned kind having variable incidence blades, the latter are set in a neutral position or at negative angles initially and are mechanically rotated, for example, by being coupled temporarily to the power unit of the machine. As soon as the blades are rotating at a sufficiently high speed to be capable of giving the required lifting action when disconnected from the power unit, the pilot adjusts them until they are at positive angles of incidence, increases the speed of the airscrew of the machine, and the machine subsequently rises.

One object of this invention is to provide an improved and much simplified arrangement and construction of parts for varying the angles of incidence of the blades of the rotors of aircraft of the above mentioned kind.

According to this invention, in or for aircraft of the kind referred to, we provide mechanism for varying the angles of incidence of the rotor blades and means for operating said mechanism which includes a control member accommodated within the rotor hub-supporting mast or equivalent and operatively connected to the incidence-varying mechanism, said member being so constructed and arranged as to be capable of following the tilting and (or) bodily displacement of the said mast or equivalent. It is convenient to make the control member reciprocable in both directions within the rotor hub-supporting mast or equivalent, and to arrange for it to include telescopic and flexible joints. For example, in one construction, the control member has a screwed connection with the rotor hub-supporting mast or equivalent and is linked at its upper end to said mechanism in order that the combined turning and axial movement of the control member will result in the movement of the mechanism to positions corresponding to the desired different angles of incidence of the rotor blades.

The mechanism for varying the angles of incidence of the rotor blades may, of course, take many forms. It is preferred, however, to use that described and claimed in the specification of Patent No. 1,750,778, in which case said mechanism would include a number of axles or spindles rotatably mounted on the rotor hub and each carrying a crank pin member or barrel having its axis inclined to the axis of the axle or spindle, the rotor blade, or a link connected thereto, being pivotally arranged upon said crank pin member or barrel. The upper end of said control member is linked to each of the crank pin axles or spindles so as to be capable of turning all of them simultaneously to vary the angles of incidence of all the rotor blades. Further details of this construction are fully described hereinafter.

As a further feature means may be provided which tend constantly to prevent decrease of the angles of incidence of the rotor blades below predetermined values, and the said means may comprise springs tending to hold the blades at positive angles of incidence, which may be adjustable.

It is preferred to connect the said control member to a control in the cockpit of the aircraft, said control being operatively connected to a clutch arranged between a driving unit and a take-off shaft which drives a starter pinion adapted to rotate the rotor hub, the arrangement being such that after the control has been moved to a predetermined position, the said clutch and the starter pinion are automatically disconnected.

In the constructional form described hereinafter the said control is also operatively connected to the control member of a clutch arranged in the mechanism connecting a driving unit to the rotor hub, the arrangement being such that the clutch is automatically disengaged when the control has been moved to a predetermined position. For the convenience of the pilot it is preferred to connect the control to means for visually indicating the angles of incidence of the rotor blades.

The rotation of the incidence control member may be effected in any convenient manner from a control operated by the pilot. For example, the rotational movement may be transmitted through gearing operated from a handwheel or the like in the cockpit. Preferably, however, the end of the control member projects downwardly below the mounting of the rotor-mast and is provided with a grooved pulley on which is wound a flexible cable, the two ends of which are attached to a control in the cockpit of the aircraft.

The present invention is conveniently used in conjunction with the invention described in the specification of our co-pending application which has matured into U. S. Patent No. 2,097,117 and relating to the longitudinal and lateral tilting of the rotor and its mounting. According to these inventions the tilting of the rotor axis is effected by means comprising a crank pin member or barrel mounted on an axle turnable in coaxial end bearings, said member or barrel having its axis inclined to the axis of said bearings and the mast of the rotor hub, in one embodiment, being mounted on the said crank-pin member or barrel through the medium of downwardly extending bracket members or arms.

In using the present invention in conjunction with the arrangement just described, the crank-pin mounting of the rotor is displaced from the axis of rotation of the rotor, so leaving a free space for the passage of the control member of the incidence-varying mechanism.

One constructional form of the invention, applied to a four-bladed rotor, in which the angles of incidence of the blades are controlled by means described and claimed in the specification of Patent No. 1,450,448, granted to one of the present applicants, is shown by way of example on the accompanying drawings, whereon:

Fig. 2 is a top plan view, partly in section, of the rotor hub;

Fig. 3 is a fragmentary sectional elevation showing the connection between a Z crank operating arm and the incidence control mechanism;

Fig. 4 is a diagrammatic view of the incidence controls;

Fig. 5 is a front view of the incidence control lever and the incidence indicator; and Fig. 6 is an elevation on the line B—B in Fig. 5.

Figure 1:
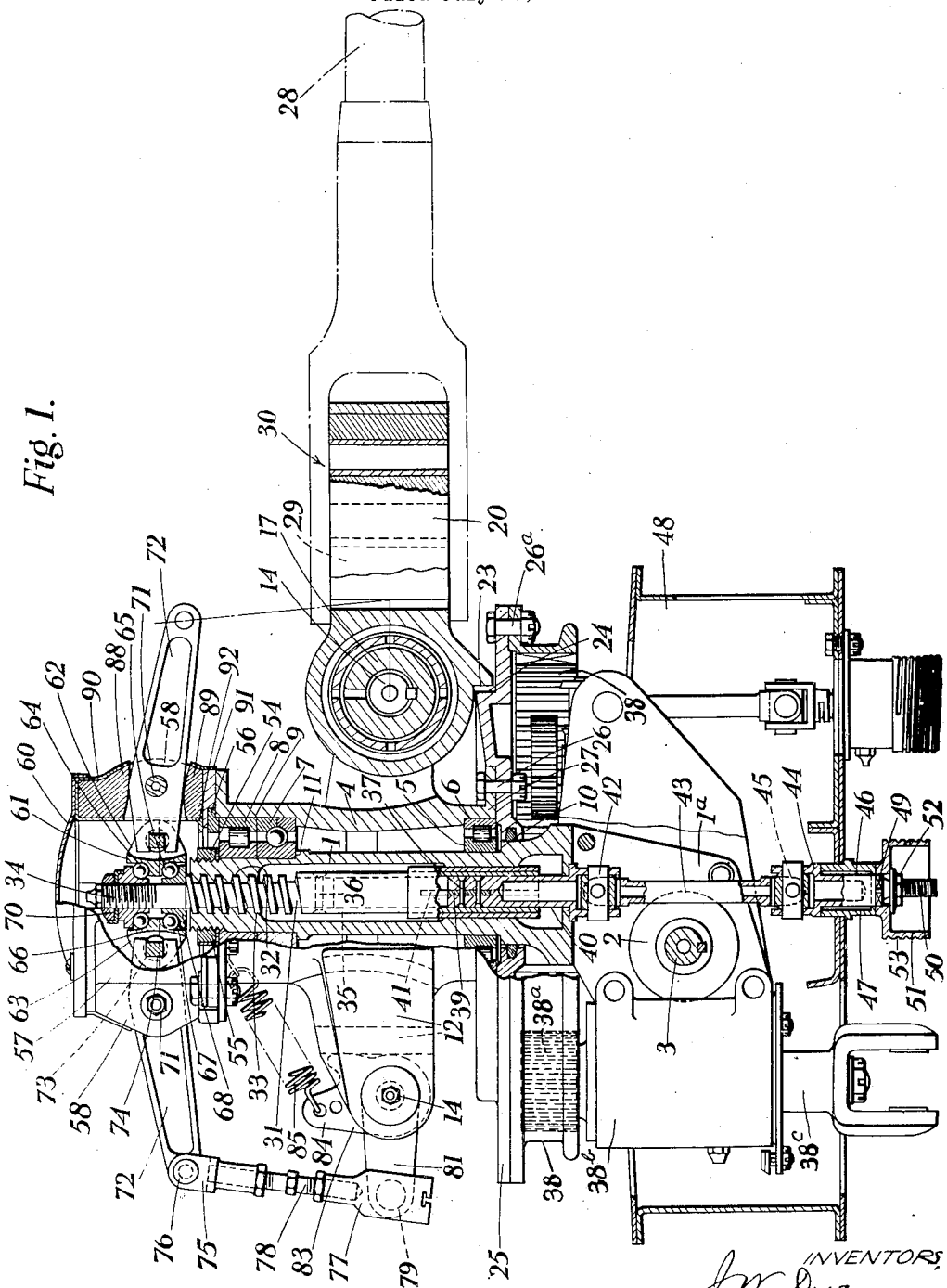
Fig. 1 is an elevation, partly in section, of the rotor hub and the rotor hub-supporting mast of the machine.

The arrangement comprises a hollow-rotor-supporting mast 1 which, as particularly described in the specification of our co-pending application which has matured into U. S. Patent No. 2,097,117 and is mounted for lateral and fore and aft tilting on the crank-pin member or barrel of a Z crank indicated generally by the numeral 2, the said member or barrel being arranged upon the axle 3 about which occurs the combined lateral and fore and aft tilting movement of the mast 1. A rotor hub 4 is turnably arranged on the outside of the mast and concentrically therewith by means of a roller-bearing 5 arranged in a recess 6 in the interior of the hub and by a combined thrust and journal bearing 7 arranged below a roller bearing 8, both bearings 7 and 8 being housed in a recess 9 formed in the upper part of the hub. The bearings 5 and 7 are seated respectively upon shoulders 10 and 11 formed on the outside of the mast. The hub 4 is provided with four pairs of spaced arms 12 and 13, the vertical plane lying centrally between the arms of each pair of arms being arranged otherwise than radially on the hub as shown in Fig. 2. The axle 14 of a hinge-pin or Z crank construction extends transversely between each pair of arms 12 and 13 and is turnable in bearings 15 and 16, provided in the said arms. Upon the axle 14 is keyed the crank-pin member or barrel 17, the axis A—A of which is inclined to the axis of the axle 14. The said member or barrel carrying a number of needle roller bearings 18 arranged in a bore 19 formed in a link block 20. The bearings 18 are arranged in two sets and are retained in position by a thrust washer 21 against which a lock nut 21A is screwed upon one end of the barrel 17, the two sets of needle roller bearings 18 being spaced apart by means of a distance collar 22 fitting over the barrel between the said sets of bearings. As will be appreciated, the link blocks 20 are free to pivot on the barrels 17 to permit the substantial vertical flapping movement of the blades when revolving about the mast 1, but each is prevented from dropping too low when the blades are stationary or only slowly rotating by means of a stop 23 adapted to cooperate with a shoulder 24 formed on a disc 25, which is secured by bolts 26 to a flange 27 on the rotor hub. This disc 25 also supports, preferably, at its outer peripherial portion an internal toothed annulus or gear 38 by means of bolts 26ᵃ. The gear 38 is engaged and disengaged by a starter pinion 38ᵃ journalled eccentrically in an oscillatory bearing contained in the housing 38ᵇ and supported on the bracket 1ᵃ of the mast 1 and tiltable with the latter. The pinion 38ᵃ has a spindle 38ᶜ fast thereto and driven from a shaft (not shown herein but shown and fully described in our co-pending applications Serial Numbers 33,396 and 33,397).

The main longitudinal spar 28 of each rotor blade is pivotally connected to the link block for lateral movement in the general plane of rotation of the rotor, that is, briefly, about a substantially vertical pivot pin engaging in a bush 29 provided in the link block 20 and passing through holes formed in the jaws of the forked end 30 of the spar, combined damping and wing-folding devices (of which the bushes 30A only are shown in the figures) being provided for limiting the lateral movement of the blade in the said plane of rotation.

The angle of incidence of each of the four rotor blades is varied by the turning of the axle 14 of each of the four hinge-pin or Z crank members. In this particular embodiment, the angles of incidence of all four blades are varied simultaneously and equally by the following construction. An incidence control spindle 31 is provided near its upper end with a square screw thread 32, which is screwed into a corresponding screw thread 33 cut internally in the upper part of the rotor-mast 1. The upper part of the spindle 31 which extends upwards beyond the top of the mast is reduced in diameter and is formed with an externally screw-threaded part 34. Part of the spindle 31 is encased in a cylindrical sleeve 35 to which it is fixed by a rivet 36. Rivets 37 serve to secure a plate 39 transversely in an operating spindle 40, said plate being adapted to engage in longitudinal keyways 41, formed in the interior of the sleeve 35. The control spindle 40 is bored centrally at its lower end and is connected by a universal joint, indicated generally by the numeral 42, to a link 43, which, in turn, is secured to the upper end of a drum spindle 44 by a universal joint indicated generally by the numeral 45. The drum spindle is rotatably arranged in a roller bearing 46 provided in the interior of a housing 47 which is fixed to the base of the rotor-supporting structure 48 and extends partly within and partly out of the latter, said structure being mounted upon a pylon structure extending upwards from the fuselage. The lower end of the drum spindle 44 is formed with a squared part 49 and with a screwed part 50 of reduced diameter, the part 49 being fitted within a correspondingly shaped hole formed in an operating drum 51 which is secured to the spindle 44 by means of a nut 52 screwed on to the part 50. The drum 51 is formed with a groove 53 adapted to receive an operating cable. It will be readily appreciated that by the cooperation of the plate 39 and keyways 41 the control spindle 40 and the sleeve 35 are capable of axial movement relatively to each other and that the telescopic joint thus formed in conjunction with the universal joints 42 and 45 allows the screwed part 32 of the spindle 31 to be screwed into and out of the screw threads 33 on the mast 1 by turning the drum 51, no matter what may be the inclination and (or) bodily displacement of the rotor mast 1 within the limits allowed by the mechanism.

The bearings 7 and 8 in the upper end of the rotor are held in position therein by means of a nut 54, which is screwed on to the top end of the rotor mast 1 and bears against a washer 55, and by a spigot ring 56 which is fitted in a recess formed in the bottom flange of a hollow hub extension 57 bolted to the top flange of the hub. The hub extension is formed with four pairs of radially extending and spaced lugs 58 and 59 and is closed at its upper end by a dust cover 60.

An operating collar 61, formed with four pairs of radially extending lugs 62 and 63. is rotatably arranged at the top end of the spindle 31 between ball bearings 64 and 65, housed respectively in recesses 66 and 67 formed in the collar 61, the bearing 65 being retained by a cone 68 and the bearing 64 by a cone 69, which is screwed upon the upper end of the spindle 31 and retained in position thereon by a nut 70 also screwed on to the spindle.

Between each of the lugs 58 and 59 on the hub extension 57 there is pivoted a transverse pin 71 serving as a fulcrum for an incidence control arm 72, the inner end of which is provided with a square recess 73 in which is engaged the squared central part of a pin 74 fitted in the adjacent pair of lugs 62 and 63 on the collar 61. A fork 75 is connected by a pin 76 to the outer end of each of the four incidence control arms 72 and is coupled to a socket 77 by means of an adjusting link 78 having opposite-handed screw threads at its opposite ends, which are screwed respectively into the fork 75 and the socket 77 whereby the effective overall length of the members 75, 78 and 77 can be increased or decreased as desired. The ball end of a pin 79 is housed within a hemispherical recess formed in the end of each of the sockets 77 and is retained therein by means of a plug 80 screwed into the socket and formed with a substantially hemispherical recess at its inner end in which the adjacent periphery of the ball head is seated. Each of the pins 79 is connected to the outer end of a lever 81 which is keyed at one end of the hinge-pin or Z crank axle 14 and is retained thereon by means of a nut 82 screwed on to the end of the shaft and which also serves to secure a lever 83 upon the said shaft. Each of the levers 83 is formed with a projection 84 to which one end of a tension spring 85 is hooked, the opposite end of the spring being hooked to an anchor plate 86 secured to the underside of the top flange of the hub 4. Each of the levers 83 is also formed with a stop 87, which is normally held in engagement with the adjacent lug 12 on the rotor hub by the pull of the spring 85.

The springs have a three-fold purpose. In the first place they assist in obtaining a quick movement of the rotor blades from negative to positive angles of incidence. Secondly, they hold the levers 81 in positions (which may be adjustable) in which the rotor blades are at positive incidence, thus minimizing any backlash that there may be in the incidence-controlling mechanism and, thirdly, they act as safety devices, in as much as in the event of a failure of the control mechanism they would tend to hold the blades in the positive incidence positions, thus enabling the aircraft to be flown in the normal manner.

Felt packings 88 and 89 are arranged in the space between each pair of lugs 58 and 59 on the hub extension 57 above and below the lever 72 and are held in position by retaining plates 90, 91 and 92.

Operating cables 93 and 94 are wound around the grooves 53 in the drum 51 as shown in Fig. 4 and the ends of the cable are led down the legs 95 and 96 of the pylon structure, which supports the structure 48, into the cockpit of the aircraft, where they are attached to a grooved quadrant 97 fixed to a spindle 98 (Fig. 6) rotatable in a bearing 99 carried by structural members of the fuselage, the said quadrant being turnable by a control lever 100. Two grooves 101 and 102 are formed in the periphery of the quadrant and the two ends of the cable are led into the grooves in opposite directions and are connected respectively to the quadrant by stops 103 and 104. The control lever works in a slot 105 formed in the out-turned flange 106 of a fixed quadrant bracket 107 and carries a pivoted safety catch 108 which is urged downwardly by means of springs 109. As shown in Figs. 5 and 6, the control lever 100 can be locked in positions corresponding to various zero angles of incidence on each of the rotor blades by a locating piece 110 fixed to a lever 111 provided with a knob 112 which is arranged in a handle 113 secured to the control lever 100. The locating piece is adapted to engage in a number of recesses 110A in the flange 106 of the quadrant bracket 107 by the action of a spring 114 and in order to move the lever 100 from one incidence position to another it is necessary first to depress the knob 112. The lever 100 is located in the running-up (or no-lift) position of the rotor by the engagement of the catch 108 in a notch 115 formed in a member 116 adjustably secured to the flange 106 and the lever is located in the normal flight position by the engagement of the catch in a notch 117 formed in a member 118 also adjustably secured to the flange 106.

A lever 119 is secured to the spindle 98 and is connected by a link 120 to a lever 121 fixed to a spindle 122 carrying a pointer 123, the outer end of which is movable near to a scale 124 marked with the angles of incidence of the rotor blades. The pointer is attached to a plate 125, and as described in the specifications Ser. Nos. 33,396 and 33,397 of our other co-pending applications, is thus operatively connected to a pawl retaining bar provided in the operating mechanism 1 of a friction clutch controlling the rotor drive, whilst the lever 121 is also connected to links 126 coupled to one end of a slide 127, the purpose of which is described in the specification of our other said co-pending application Ser. No. 33,397.

Whilst the machine is on the ground the rotor blades are normally kept at negative angles of incidence, the catch 108 then being engaged in the notch 115. In this position of the control lever 100, the aircraft can be left standing quite safely even in a strong wind sufficient to cause the rotor blades to rotate, since as the blades are at negative incidence there is no danger of the blades being blown upwards or of the aircraft being lifted by the wind.

Before the engine is started, the pilot engages the dog-clutch and starter pinion as described in the specification of another of our co-pending applications Ser. Nos. 33,396 and 33,397 and, with the engine running slowly, by means of the hand control lever, the friction clutch is pulled into engagement. The machine is held stationary by means of wheel brakes operated by rudder pedals and the engine is then accelerated until the rotor attains a predetermined speed, whereafter the brakes are released and the incidence control lever 100 is pulled right back into the maximum position which is beyond the normal flight position where, as indicated, the catch 108 would engage in the notch 117, the maximum positive incidence position being predetermined according to the characteristics of the rotor blades. This movement of the control lever 100 is transmitted through the cables 93 and 94 to the drum 51, link 43 spindle 40 and sleeve 35, Fig. 1, to the screwed spindle 31, which is thus turned in a direction to cause all the levers 72 and, consequently the levers 81 to pivot and all the Z-crank axles 14 to be turned in such a direction that the angles of incidence of all the rotor blades are at maximum incidence. The aforesaid dog-clutch, the starter pinion and the friction clutch are, however, all thrown out of engagement when the control lever 100 is in the position corresponding to a predetermined incidence on the rotor blades, as described in the above mentioned co-pending applications.

The aircraft becomes air-borne after a forward run, the length of which depends to some extent upon the speed attained by the rotor before the drive is disconnected. Theoretically, it should be possible to take-off in still air with no forward run.

When the machine has climbed to the desired altitude, the pilot moves the incidence control lever 100 forward again until the catch 108 has engaged in the notch 117. During this movement, of course, the drum 51, link 43, spindle 40, sleeve 35, screwed spindle 31, levers 72 and 81 and the axles 14 are all moved in the opposite direction, the rotor blades thus being turned from maximum incidence to the normal flying position, i. e., the setting found by calculation or experience to be the best for level flight at cruising speed. By means of the levers 119 and 121 and the link 120 any movement of the control lever 100 is shown by the pointer 123 and the scale 124, so that the pilot can ascertain at any time the setting of the rotor blades.

The ramps on the forward and after ends of the catches 116 and 118 should be noted. These enable the pilot to find the two most important positions of the lever 100 quickly and positively by feel only and without diverting his attention from the ordinary flying controls.

It will be appreciated that the invention is applicable to auto-rotative rotor systems or to rotor systems which are or can be driven mechanically during flight.

Furthermore, although the invention has been described above with specific reference to a rotor hub supporting member which is adapted for lateral tilting and tilting in a fore and aft direction, it will be understood that the invention is applicable to such members adapted to be displaced bodily of the aircraft.

We claim:

1. In an aircraft of the kind referred to including variable incidence rotor blades the combination comprising, a rotor hub supporting mast capable of tilting with respect to the aircraft, mechanism for varying the angles of incidence of the rotor blades and means for operating said mechanism when said rotor hub supporting mast occupies any position within its range of movement including a control member housed within said rotor hub supporting mast in threaded engagement therewith, said mechanism being operated by a combined turning and axial movement of said control member, said control member being telescopically and flexibly connected to a control element mounted on a fixed part of the aircraft and adapted to be operated by the operator of the aircraft.

2. In an aircraft of the kind referred to including variable incidence rotor blades the combination comprising, a rotor hub and supporting mast capable of tilting with respect to the aircraft, mechanism for varying the angles of incidence of the rotor blades, means including a control member for operating said mechanism when said rotor hub supporting mast occupies any position within its range of movement, a pilot control located in the cockpit of the aircraft for operating said control member, a drive connection between a source of power and said rotor hub for rotating the latter including a clutch and a starter pinion, and means for automatically disconnecting said clutch and said starter pinion when said pilot control has been moved to a predetermined position.

3. In an aircraft of the kind referred to including variable incidence rotor blades the combination comprising, a rotor hub and supporting mast capable of tilting with respect to the aircraft, mechanism for varying the angles of incidence of the rotor blades, means including a control member for operating said mechanism when said rotor hub supporting mast occupies any position withing its range of movement, a pilot control located in the cockpit of the aircraft for operating said control member, a drive connection between a source of power and said rotor hub for rotating the latter including a clutch and a starter pinion, means for automatically disconnecting said clutch and said starter pinion when said pilot control has been moved to a predetermined position and means for visually indicating the angles of incidence of the rotor blades.

4. In an aircraft of the kind referred to including variable incidence rotor blades, the combination of a rotor hub and supporting mast capable of tilting with respect to the aircraft, mechanism for varying the angle of incidence of all the rotor blades in common, and means for operating said mechanism including a control member extending through the sub, said incidence varying mechanism including a Z-crank for each blade comprising a crank pin member carried on a shaft journaled in the hub to rotate on an axis at an angle to the axis of the hub and oblique to a radius of the hub passing through a substantially central portion of the crank pin member, each said Z-crank carrying a blade journaled thereon to swing about the Z-crank on an axis oblique to the axis of rotation of the Z-crank shaft, and means for transmitting motion from said control member to said Z-cranks in common for rotating the latter to vary the angle of incidence of all the blades, said motion transmitting means comprising levers pivotally mounted upon the rotor hub and connected to the control member through means turnable on the control member.

5. The combination as claimed in claim 4, in which the Z-cranks are biased to a position corresponding to an angle of incidence of the rotor blades above a predetermined value.

6. The combination as claimed in claim 4 in which the Z-cranks are adjustably biased to a position corresponding to an angle of incidence of the rotor blades above a predetermined value.

7. The combination as claimed in claim 4, in which the Z-cranks are spring biased to a position corresponding to an angle of incidence of the rotor blades above a predetermined value.

8. The combination as claimed in claim 4 in which the Z-cranks are biased to a position corresponding to an angle of positive incidence of the rotor blades.

9. A combination as claimed in claim 4, in which the motion transmitting means is adjustable to permit individual adjustment of the angle of incidence of each rotor blade while the aircraft is not in flight.

10. In an aircraft of the kind referred to, the combination of a rotor hub and supporting mast capable of tilting with respect to the aircraft, variable incidence rotor blades, a plurality of Z-cranks rotatably mounted upon said hub, each of said blades having a free pivotal connection about one of said Z-cranks respectively, a control member arranged within the supporting mast, means interconnecting the control member to said Z-cranks and remote control means for operating said control member and thereby varying the angles of incidence of all the rotor blades simultaneously.

11. The combination as claimed in claim 10, wherein said control member has a screw feed movement and a telescoping joint therein, the upper end of said control member being connected by lever and linkage mechanism to each of said Z-cranks and its lower end being connected with means for rotating the same.

12. In an aircraft of the rotary wing type including variable incidence rotor blades, the combination comprising a rotor hub, a plurality of rotor blades, means for pivotally mounting the blades on said hub and permitting them to flap, means for adjusting blade incidence including rotating each blade pivot about its pivotal axis, a rotor hub supporting mast capable of tilting with respect to the aircraft, mechanism connected to said adjusting means to actuate the same to vary the angles of incidence of the blades at will independently of, and during, the flapping movement of the blades about said pivot means, and means including a control member for actuating said mechanism in any position of said rotor hub supporting mast within its range of movement.

13. In an aircraft of the rotary wing type including variable incidence rotor blades, the combination comprising a rotor hub, a plurality of rotor blades, means for pivotally mounting the blades on said hub and permitting them to flap, means for adjusting blade incidence including rotating each blade pivot about its pivotal axis, a rotor hub supporting mast capable of tilting with respect to the aircraft, and means for rotating the pivot of each blade in any position of the rotor hub supporting mast within its range of movement without affecting the flapping movements of the blades.

14. The combination as set forth in claim 12 in which the control member includes a reciprocating part within the rotor hub supporting mast and connected with said mechanism and further including another part extending below the mast and connected with means for rotating the same whereby the operation of said control member is effected.

15. The combination set forth in claim 13 wherein the means for pivotally mounting the blades on the hub includes a plurality of Z-cranks, one for each blade; and means interconnecting the means for adjusting blade incidence to said Z-cranks.

JOHN WILLIAM DYER.
DAVID KAY.